Sept. 20, 1932.                H. GEORGE                 1,878,392
                           GLASS WORKING FURNACE
                         Filed Oct. 23, 1928      2 Sheets-Sheet 1
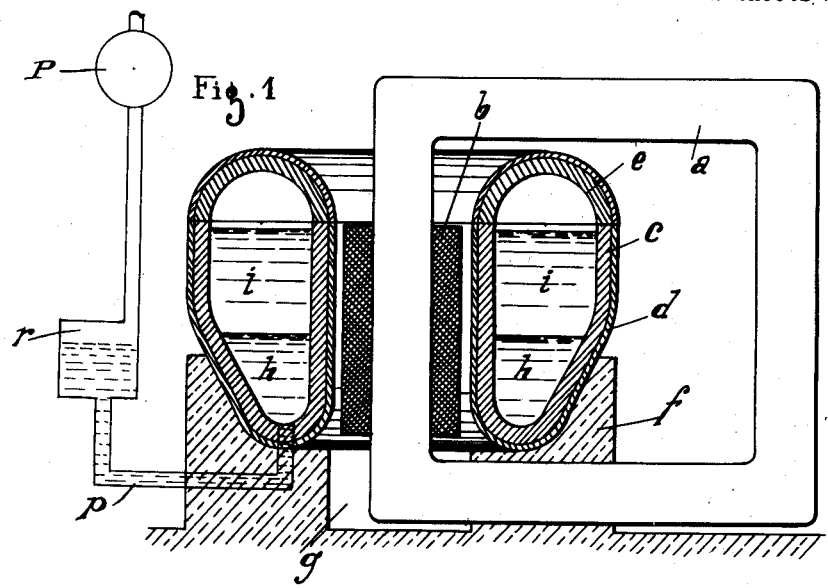

Patented Sept. 20, 1932

1,878,392

UNITED STATES PATENT OFFICE

HENRI GEORGE, OF PARIS, FRANCE

GLASS WORKING FURNACE

Application filed October 23, 1928, Serial No. 314,454, and in France October 25, 1927.

The copending application Serial No. 227,825, filed by Henri George, October 21, 1927, for "improvement in electrical furnaces" relates to the arrangement in the interior of these furnaces of an intermediate conductive and liquid mass in the working conditions of the furnace, to which mass the electrical energy is applied either directly, or by induction.

The present invention relates to a furnace based upon the same principle and in which the glass is in direct contact with the intermediate mass constituted in this case by a bath of molten metal and preferably tin.

It has been ascertained in effect that no chemical reaction is produced between the tin and the glass at the temperatures which are necessary for the melting of the latter. Moreover, the layer of glass which surmounts the bath of metal opposes the oxidation and the volatilization of the latter.

The accompanying drawings represent by way of example one of the forms of carrying out the object of the invention.

Figure 1 is a section in a vertical plane passing through the axis of the furnace.

Figure 2 is a modification in detail of the foregoing.

Figure 3 is a plan view on a smaller scale, the cover being supposed removed.

Figure 4 is a section of the foregoing along line 4—4.

Figure 5:
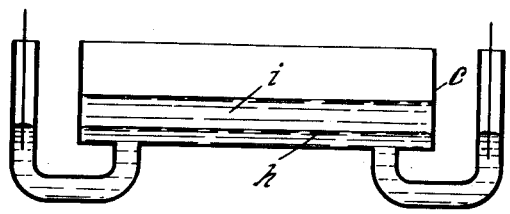
Figs. 5 and 6 show diagrammatically means for varying the level of the molten metal.

The furnace represented by Figure 1 is a single phase induction furnace of low frequency in which the mass of glass is in direct contact with the bath of metal.

$a$ designates the magnetic circuit of the furnace, $b$ the primary winding, $c$ is a toric refractory crucible which surrounds the primary winding. It comprises a heat insulated casing $d$ and a cover $e$ likewise insulated. The crucible rests upon a suitable foundation $f$. This foundation comprises a basin $g$ allowing in case of accidental breakage of the crucible, of conveniently collecting the metal of the bath. The latter occupies the bottom of the crucible at $h$; it is constituted preferably by tin. Above at $i$ is the molten glass which consequently floats upon the metallic bath.

This furnace presents for the manufacture of glass, a large number of advantages;

In the first place, the efficiency is as high as possible.

In effect, the electrical energy is applied by induction to the bath of metal. The latter is in the interior of the insulated crucible containing the glass and in direct contact with the latter.

The energy is therefore employed under the best possible conditions. It is to be noted also that from the moment when the mass of glass becomes conductive, it can be heated directly by induction in its own mass.

The working of the furnace involves no expenditure of electrodes. The mass of tin constitutes a capital lock up made once for all. The vapour tension of this metal remains in fact very low at the temperatures necessary for the fusion of the glass. All loss of metal is moreover avoided by the arrangement of the glass on the surface of the bath. It has been ascertained that no chemical action is produced on the other hand between the glass and the metal.

It is easy, by acting either upon the primary voltage, or upon the frequency, or upon the elements of the magnetic circuits, or upon the quantity of metal contained in the crucible, to regulate with care and to control perfectly the temperature of the furnace.

The toric crucible is provided either with working holes for collecting the glass, or with discharge devices for pouring, roaming or drawing the content of the crucible. In order to facilitate these operations the furnace may be mounted upon a movable base, on rails or upon a tilting base.

The mass of tin can be connected through pipe p to a reserve of molten metal contained in a receptacle r heated by conduction of heat in the vicinity of the furnace, or if necessary by means of an auxiliary furnace. The pressure in the vessel r containing this reserve can be varied by means of a pump p or by any other means, so that a certain quantity of metal can be admitted into crucible c or expelled therefrom, that is to say the level of the metal in the melting crucible containing the glass can be varied and the whole of the mass of glass thus displaced in the crucible.

This operation is contemplated either for mixing the glass, or for emptying the crucible at the moment of the pouring of the whole or part of its content, or for withdrawing the metal completely, or again for maintaining the level of the glass constant during the operations of drawing and rolling.

This displacement can be utilized likewise for varying the surface area of contact between the glass and the metal and correlatively the thickness of this latter. This result may be attained by giving to the toric crucible a cross section of variable width. For example, the crucible may have the cross section represented in Figure 2. It is then possible during the melting to fix the level of the metal at 1, that of the glass being at 1', then at the moment of the fining to admit the metal up to 2, the glass coming to 2'. In these conditions, the fining is produced in thin layers and the glass is thus improved.

These arrangements can be useful for the manufacture of optical glass.

The crucible may be provided in its upper parts with radial partitions or bars or dams k, dividing the mass of glass but naturally leaving the ring of metal continuous (Figures 3 and 4).

If the level of the metal is above the lower part of the partition, it is possible to carry out in the same furnace the fusion of several different glasses.

If on the contrary, the level of the metal is below the lower edge of the bars or dams, the various compartments communicate with one another only at bottom and one of them can be utilized for pouring the composition therein while another serves for the fining.

It is on the other hand easy to modify the cross section of the crucible in such a way as not to have a uniform heating of all the compartments. For example in the fining compartments, it is possible at the same time to reduce the cross section of the metal and to increase the surface area of contact with the glass in such a way as to raise the temperature.

This form of construction of the furnaces forming the object of the invention lends itself to the construction of crucibles of large dimensions. In effect it is possible to support the crucible mechanically at all parts, which allows it to resist when heated the pressure of the metal and of the glass and ensures it a longer life. Naturally the setting up of the crucible and of its supports is carried out by dismantling a part of the magnetic circuit of the furnace.

For the starting of the furnace one can proceed in the following manner;

The crucible is dried and baked before setting up. The metal, fused in an auxiliary furnace, is introduced therein in the liquid state. The current is then applied to the furnace at reduced voltage, in such a way as to raise very gradually the temperature of the bath. There is then poured upon the surface of the bath before its temperature attains that of red heat, a mass of glass melted in another furnace, which mass is allowed to sink down over the walls of the crucible and upon the surface of the bath. At this moment the furnace is raised in temperature in such a way as to obtain as rapidly as possible a continuous ring of glass.

Thereafter glass will always be left on the surface of the bath in order to avoid pouring the composition directly upon the metal.

In order to facilitate the drying and starting up there can be arranged in the known manner upon the wall of the crucible or in the interior of the latter a conductive and refractory ring, for example of graphite, intended to heat it during the period of bringing into working.

The invention is not limited to melting furnaces, but comprises likewise the construction of furnaces allowing of the special operations of the glass industry, for example furnaces in which the bath of metal is utilized for the spreading of sheets or the softening or the annealing etc.

The furnace represented is a single phase low frequency induction furnace. This construction has been considered only by way of example and for the convenience of the description. Thus the metallic bath can be heated electrically by other means, for example by direct passage of the current in its mass.

This last means can with advantage be employed in the following manner:

It is known that it has already been proposed to fine glass by causing it to be traversed directly by the current when it has attained by fusion a sufficient electrical conductivity. In the systems proposed, the electrical energy is not employed for melting the glass, it comes into action only when the glass has become conductive.

Figure 6:
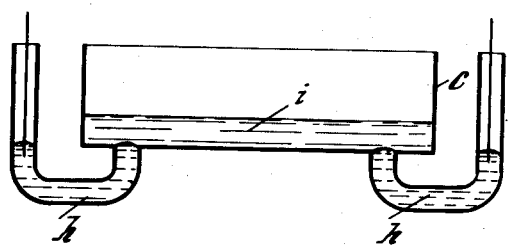

The electrical furnace which forms the object of the present invention allows of carrying out easily, first the melting of the glass in contact with the bath, as has just been explained, and then the direct electrical fining. It suffices for this to vary the level of the bath of tin, according to the invention, so to break the circuit in the metal and to ensure the passage of the current in the mass of glass. It is easy to pass from one stage to the other by simple variation of the level of the metal, as shown by Figures 5 and 6, where $h$ is the bath of molten tin and $i$ is the glass. There can likewise be employed a known device allowing of utilizing three phase current directly and all devices allowing of increasing the power factor of the furnace.

What I claim is:

1. In a glass working furnace, a mass of molten tin with the glass floating above, means connected to a source of electrical energy and adapted for supplying it to the molten tin.

2. In a glass working furnace, a toric crucible, a mass of molten metal therein with the glass floating above and means connected to a source of electrical energy and adapted for supplying it to the molten metal.

3. In a glass working furnace, a toric crucible, a mass of molten metal therein with the glass floating above, a magnetic core, going through the central passage of the toric crucible and a primary winding and the said core connected with a source of alternating electric current.

4. In a glass working furnace, a toric crucible a mass of molten metal therein with the glass floating above, radial partitions in the toric crucible, passages provided in the said partitions for the molten metal and means connected to a source of electrical energy and adapted for supplying it to the molten metal.

5. A furnace for the treatment of glass comprising a crucible having a horizontal cross section which varies along its height, a mass of molten metal forming a relatively thick layer at the lower part of said crucible and adapted to support the glass floating upon it, means for causing electric current to flow through said mass of metal, and means for varying the quantity of metal contained in the crucible, whereby the level of the surface of contact between the metal and the glass and consequently its area can be varied.

6. A furnace for the treatment of glass comprising a crucible having a horizontal cross section which varies along its height, a mass of molten metal forming a relatively thick layer at the lower part of said crucible and adapted to support the glass floating upon it, means for causing electric current to flow through said mass of metal, a receptacle containing a reserve of molten metal, a pipe connecting said receptacle to the bottom of said crucible, and means for varying the pressure within said receptacle, whereby the level of the surface of contact between the metal and the glass, and consequently its area, can be varied.

7. The method of regulating the heating of a mass of molten glass which comprises placing the mass of molten glass upon a metallic liquid resistor whose density is greater than that of glass, so that said mass of glass floats thereupon, causing current to flow through said resistor, and varying the area of the surface of contact between the glass and the metal.

In testimony whereof I have signed this specification.

HENRI GEORGE.